United States Patent
Ito et al.

(10) Patent No.: US 6,719,664 B2
(45) Date of Patent: Apr. 13, 2004

(54) CONTROL APPARATUS OF LOCK-UP CLUTCH FOR VEHICLE AND CONTROL METHOD THEREOF

(75) Inventors: Takuya Ito, Toyota (JP); Hiroaki Takeuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/230,255

(22) Filed: Aug. 29, 2002

(65) Prior Publication Data

US 2003/0045400 A1 Mar. 6, 2003

(30) Foreign Application Priority Data

Aug. 30, 2001 (JP) ......................... 2001-262011

(51) Int. Cl.[7] ................. B60K 41/02; B60K 41/24; B60K 41/28
(52) U.S. Cl. .................. 477/176; 477/181; 477/83; 477/62
(58) Field of Search ............... 477/176, 181, 477/83, 86, 90, 110, 54, 62

(56) References Cited

U.S. PATENT DOCUMENTS

| | | | | |
|---|---|---|---|---|
| 5,480,363 A | * | 1/1996 | Matsubara et al. | 477/63 |
| 5,547,438 A | * | 8/1996 | Nozaki et al. | 477/169 |
| 5,733,223 A | * | 3/1998 | Matsubara et al. | 477/175 |
| 5,807,209 A | * | 9/1998 | Matsubara et al. | 477/176 |
| 5,816,979 A | * | 10/1998 | Shiiba et al. | 477/176 |

FOREIGN PATENT DOCUMENTS

| | | | | |
|---|---|---|---|---|
| JP | 05149423 A | * | 6/1993 | F16H/61/14 |
| JP | 06331023 A | * | 11/1994 | F16H/61/14 |
| JP | 07071594 A | * | 3/1995 | F16H/61/14 |
| JP | 11-257484 | | 9/1999 | |

* cited by examiner

Primary Examiner—Tisha D Lewis
(74) Attorney, Agent, or Firm—Oblon, Spivak, McClelland, Maier & Neustadt, P.C.

(57) ABSTRACT

When a deceleration slip executing minimum gear stage is not established in a state of continuously executing a deceleration slip control at a target slip amount, it is judged whether or not an input shaft rotational speed of a transmission becomes a down shift judging rotational speed. When it becomes equal to or less than a predetermined down shift judging rotational speed, a down shift is executed, and a clutch pressure is controlled such that an engine rotational speed becomes a target engine rotational speed.

14 Claims, 6 Drawing Sheets

| SHIFT POSITION | | SOLENOID No.1 | SOLENOID No.2 | C1 | C2 | B1 | B2 | F1 | B3 | F2 | C0 | F0 | B0 |
|---|---|---|---|---|---|---|---|---|---|---|---|---|---|
| P | | ⊗ | ⊗ | | | | | | | | ○ | | |
| R | | ⊗ | ⊗ | | ○ | | | | | | ○ | | |
| N | | ⊗ | ⊗ | | | | | | | | ○ | | |
| D | 1st | ○ | × | ○ | | | | | | | ○ | ○ | |
| D | 2nd | ○ | ○ | ○ | | | ○ | | | ○ | ○ | ○ | |
| D | 3rd | × | ○ | ○ | ○ | | ○ | | | | ○ | ○ | |
| D | O/D | × | × | ○ | ○ | | ○ | | | | | | ○ |
| S | 1st | ○ | × | ○ | | | | | | | ○ | ○ | |
| S | 2nd | ○ | ○ | ○ | | | ○ | ○ | | ○ | ○ | ○ | |
| S | 3rd | × | ○ | ○ | ○ | | ○ | | | | ○ | ○ | |
| S | O/D | × | × | ○ | ○ | | ○ | | | | | | ○ |
| L | 1st | ○ | × | ○ | | ○ | | | ○ | ○ | ○ | ○ | |
| L | 2nd | ○ | ○ | ○ | | | ○ | ○ | | | ○ | ○ | |

CONTROL APPARATUS OF LOCK-UP CLUTCH FOR VEHICLE AND CONTROL METHOD THEREOF

INCORPORATION BY REFERENCE

The disclosure of Japanese Patent Application No. 2001-262011 filed on Aug. 30, 2001 including the specification, drawings, and abstract is incorporated herein by reference in its entirety.

BACKGROUND OF THE INVENTION

1. Field of the Invention

This invention relates to a control apparatus of a lock-up clutch for a vehicle and a control method thereof, and more particularly to a control apparatus of a lock-up clutch for a vehicle which can extend a time for executing a fuel-cut control, and a control method thereof.

2. Description of the Related Art

There is a technique of increasing a fuel-cut time by slip controlling a lock-up clutch at a time when a vehicle is decelerated, thereby increasing a fuel consumption, and this technique is disclosed, for example, in Japanese Patent Application Laid-open Publication No. 11-257484. During a deceleration slip in which the lock-up clutch is slip controlled at a time when the vehicle is decelerated, since it is possible to maintain an engine rotational speed substantially at the same rotational speed as a turbine rotational speed, it is possible to maintain the engine rotational speed higher compared to a case of disengaging the lock-up clutch, and it is possible to increase the fuel-cut time.

However, in the technique mentioned above, at a time when the vehicle is decelerated in a high gear stage of an automatic transmission, since the fuel-cut control is finished earlier than a case of a low gear stage, there has been room for improvement in view of improving a fuel consumption. That is, a condition of executing the fuel-cut control has a lower limit due to the engine rotational speed. Further, the turbine rotational speed with respect to a vehicle speed is lower in the high gear stage than in the low gear stage. Even when the lock-up clutch is slip controlled, the engine rotational speed is only maintained at substantially the same rotational speed as the turbine rotational speed, so that there has been a problem that the fuel-cut time becomes shorter in the high gear stage than in the low gear stage.

Further, at the time of deceleration by initially setting to the low gear stage, the fuel-cut time is increased, however, there is a problem that an engine brake is applied too much, and an uncomfortable feeling is generated in a driver, so that it is hard to put it to practical use.

The reason why such a problem is generated is that since the turbine rotational speed becomes large and the engine rotational speed becomes large at a time of executing a shift down in a high speed vehicle, engine friction torque becomes large. Further, inertia torque is added accompanying with an increase of the engine rotational speed, and engine brake torque is amplified by an increased amount of gear ratio.

SUMMARY OF THE INVENTION

In order to solve the problems mentioned above, it is an object of the invention to provide a control apparatus of a lock-up clutch which can increase a time for executing a fuel-cut control, and a control method thereof.

In accordance with a first aspect of the invention, there is provided a control apparatus of a lock-up clutch for a vehicle. The control apparatus has fuel-cut control portion having a hydraulic power transmission with a lock-up clutch which directly connects between an engine and an automatic transmission, stopping supplying a fuel to the engine at a time when a speed of the vehicle is reduced, and restarting supplying the fuel to the engine at a time of judging that at least any one of the rotational speed of the engine and an input shaft rotational speed of the automatic transmission becomes a predetermined fuel-cut end rotational speed, a slip control portion which executes a slip control of the lock-up clutch at a time when the vehicle is decelerated, and a shift control portion which shifts down the automatic transmission at a time of judging that the rotational speed of the engine becomes a down shift rotational speed which is higher than the fuel-cut end rotational speed by a predetermined amount, during an execution of the slip control by the slip control portion.

In accordance with the first aspect mentioned above, at a time when at least any one of the rotational speed of the engine and the input shaft rotational speed of the automatic transmission becomes the rotational speed higher than the fuel-cut end rotational speed by the predetermined amount during the slip control of the lock-up clutch at a time when the vehicle is decelerated, the down shift of the automatic transmission is executed. Since an input shaft rotational speed of the automatic transmission becomes high in accordance with the down shift of the automatic transmission, it is possible to prevent the engine rotational speed from being reduced. As a result, it is possible to increase a time required until the engine rotational speed reaches the fuel-cut end rotational speed, and it is possible to increase a fuel-cut time. Further, since the down shift is executed immediately before the engine rotational speed reaches the fuel-cut end rotational speed, it is possible to restrict an adverse effect that an uncomfortable feeling is given to the driver due to the increase of the deceleration of the vehicle caused by an increase of an engine friction torque and an inertia torque.

Further, the slip control portion may change a slip amount of the lock-up clutch so as to restrict the increase of the engine rotational speed in accordance with the down shift of the automatic transmission.

Since the lock-up clutch is slipped so as to restrict the increase of the engine rotational speed caused by the down shift at a time of executing the down shift of the automatic transmission, it is possible to restrict the increase of the engine friction torque and the inertia torque, and it is possible to properly restrict the increase of the deceleration of the vehicle.

Further, the slip control portion may slip the lock-up clutch so as to prevent the rotational speed of the engine from being increased in accordance with the down shift of the automatic transmission.

Since the lock-up clutch is slipped so as to prevent the engine rotational speed from being increased, it is possible to properly restrict the increase of the engine friction torque and the inertia torque.

Further, the slip control portion may slip the lock-up clutch so as to keep the rotational speed of the engine during a period after the automatic transmission is shifted down and until the input shaft rotational speed of the automatic transmission reaches the predetermined rotational speed to the engine rotational speed immediately before the automatic transmission is shifted down.

Since the rotational speed of the engine during the period after the automatic transmission is shifted down and until the input shaft rotational speed of the automatic transmission reaches the predetermined rotational speed is kept to the engine rotational speed immediately before the automatic transmission is shifted down, it is possible to property restrict both of the increase of the inertia torque and the reduction of the engine rotational speed.

In accordance with a second aspect of the invention, there is provided a control apparatus of a lock-up clutch for a vehicle. The control apparatus has a slip control portion having a lock-up clutch which directly connects between an engine and an automatic transmission, and increasing a fuel-cut time required from a start of a fuel-cut at which a fuel supply to the engine is stopped and until an engine rotational speed reaches a fuel-cut end rotational speed, by slip controlling the lock-up clutch at a time when the vehicle is decelerated, a shift transmission control portion which increases the fuel-cut time by shifting down the automatic transmission immediately before the engine rotational speed reaches the fuel-cut end rotational speed.

In accordance with the second aspect, since the input shaft rotational speed of the automatic transmission becomes high by shifting down the automatic transmission immediately before the engine rotational speed reaches the fuel-cut end rotational speed, it is possible to restrict a reduction of the engine rotational speed. As a result, it is possible to increase the time required until the engine rotational speed reaches the fuel-cut end rotational speed, and it is possible to increase the fuel-cut time. Further, since the down shift is executed immediately before the engine rotational speed reaches the fuel-cut end rotational speed, it is possible to restrict the adverse effect that the uncomfortable feeling is given to the driver due to the increase of the deceleration of the vehicle in accordance with the increase of the engine friction torque and the inertia torque.

In accordance with a third aspect of the invention, there is provided a control method of a lock-up clutch for a vehicle having a hydraulic power transmission with a lockup clutch which directly connects between an engine and an automatic transmission, stopping supplying a fuel to the engine at a time when a speed of the vehicle is reduced, and restarting supplying the fuel to the engine at a time of judging that a rotational speed of the engine becomes a predetermined fuel-cut end rotational speed. The control method comprises executing a slip control of the lock-up clutch at a time when the vehicle is decelerated, shifting down the automatic transmission at a time of judging that at least any one of the rotational speed of the engine and the input shaft rotational speed of the automatic transmission becomes a down shift rotational speed which is higher than the fuel-cut end rotational speed by a predetermined amount, during an execution of the slip control by the slip control portion.

In accordance with a fourth aspect of the invention, there is provided a control method of a lock-up clutch for a vehicle having a lock-up clutch which directly connects between an engine and an automatic transmission. The control method comprises increasing a fuel-cut time required from a start of a fuel-cut at which a fuel supply to the engine is stopped and until an engine rotational speed reaches a fuel-cut end rotational speed, by slip controlling the lock-up clutch at a time when the vehicle is decelerated, and increasing the fuel-cut time by shifting down the automatic transmission immediately before the engine rotational speed reaches the fuel-cut end rotational speed.

In accordance with the third and fourth aspects, since the input shaft rotational speed of the automatic transmission becomes high by shifting down the automatic transmission, immediately before the engine rotational speed reaches the fuel-cut end rotational speed, it is possible to restrict the reduction of the engine rotational speed. As a result, it is possible to increase the time required until the engine rotational speed reaches the fuel-cut end rotational speed, and it is possible to increase the fuel-cut time.

DETAILED DESCRIPTION OF THE PREFERRED EMBODIMENTS

A description will be in detail given below of an embodiment in accordance with the invention with reference to the accompanying drawings.

Figure 1:
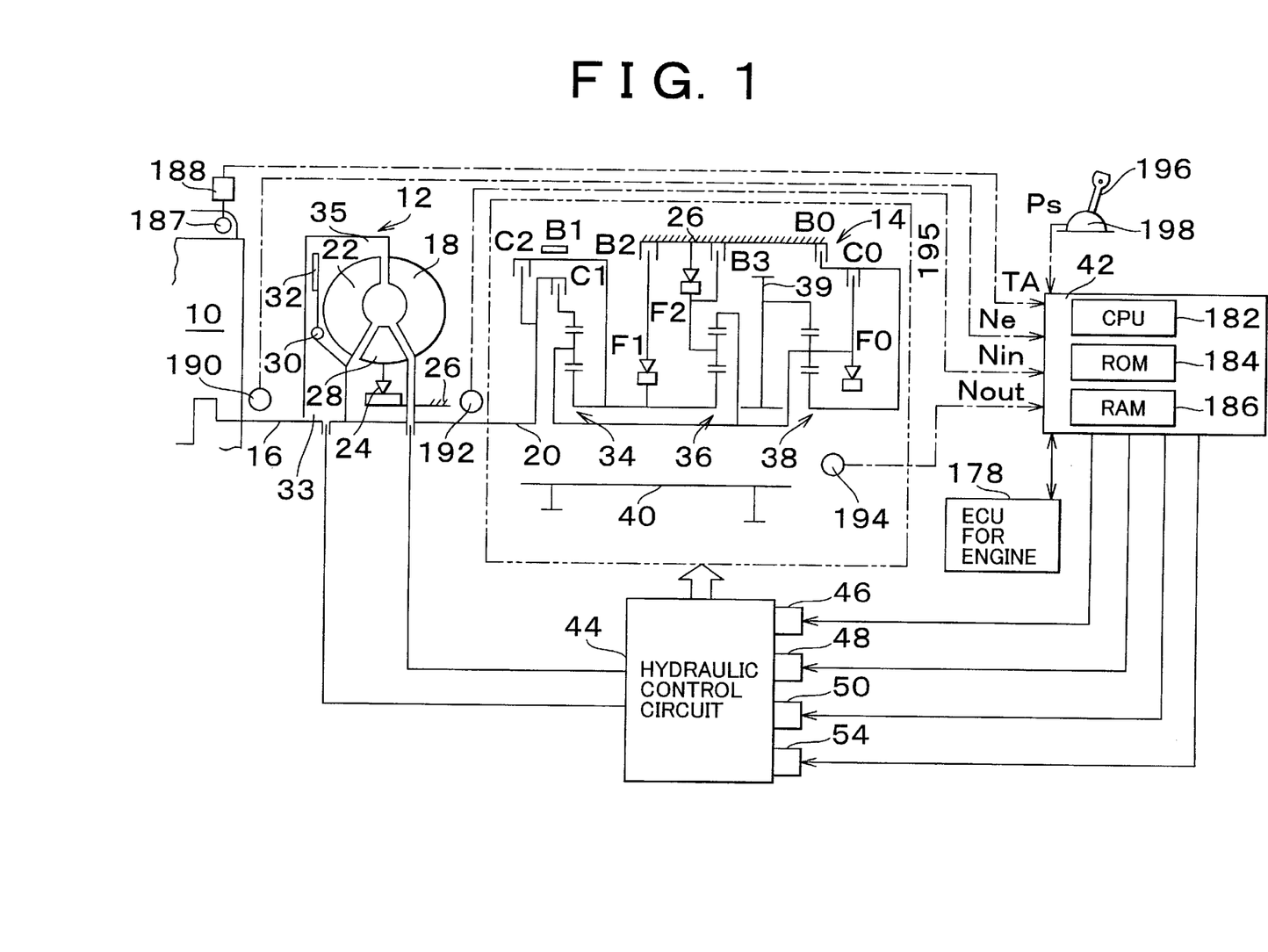
FIG. 1 is a view showing a power transmission apparatus for a vehicle to which a control apparatus of a lock-up clutch in accordance with an embodiment of the invention is applied.

FIG. 1 is a view showing a main portion of a power transmission apparatus for a vehicle to which an embodiment in accordance with the invention is applied. With reference to FIG. 1, a power of an engine 10 is transmitted to a differential gear apparatus and a drive wheel (which are not illustrated), via a stage type automatic transmission 14 constituted by a torque converter 12 with a lock-up clutch, three sets of planetary gear units and the like.

The torque converter 12 mentioned above is provided with a pump blade wheel 18 connected to a crank shaft 16 of the engine 10, a turbine blade wheel 22 fixed to an input shaft 20 of the automatic transmission 14 and rotated by an oil applied from the pump blade wheel 18, a stator solid wheel 28 fixed to a housing 26 corresponding to a non-rotary member via a one-way clutch 24, and a lock-up clutch 32 connected to the input shaft 20 via a damper 30. When a hydraulic pressure within a disengagement-side hydraulic chamber 33 is made higher than an engagement-side hydraulic chamber 35 within the torque converter 12, the lock-up clutch 32 is made in a non-engaged state, so that a torque is transmitted at an amplification factor corresponding to an input and output rotational speed ratio of the torque converter 12. However, when the hydraulic pressure within the engagement-side hydraulic chamber 35 is made higher than the disengagement-side hydraulic chamber 33, the lock-up clutch 32 is made in an engaged state, so that an input and output member of the torque converter 12, that is, a crank shaft 16 and an input shaft 20 are made in a lockup state.

The automatic transmission 14 is provided with three sets of single pinion type planetary gear apparatuses 34, 36 and 38 that are coaxially arranged, the input shaft 20 mentioned above, and a counter shaft (an output shaft) 40 transmitting a power between an output gear 39 rotating together with a ring gear of the planetary gear apparatus 38 and the differential gear apparatus. A part of constituting elements of the planetary gear apparatuses 34, 36 and 38 is not only integrally connected to each other, but also selectively connected to each other by three clutches C0, C1 and C2. Further, a part of the constituting elements of the planetary gear apparatuses 34, 36 and 38 is selectively connected to the housing 26 by four brakes B0, B1, B2 and B3, and a part of the constituting elements is structured such as to be engaged with each other or with the housing 26 in accordance with a rotational direction thereof by three one-way clutches F0, F1 and F2.

Figure 2:
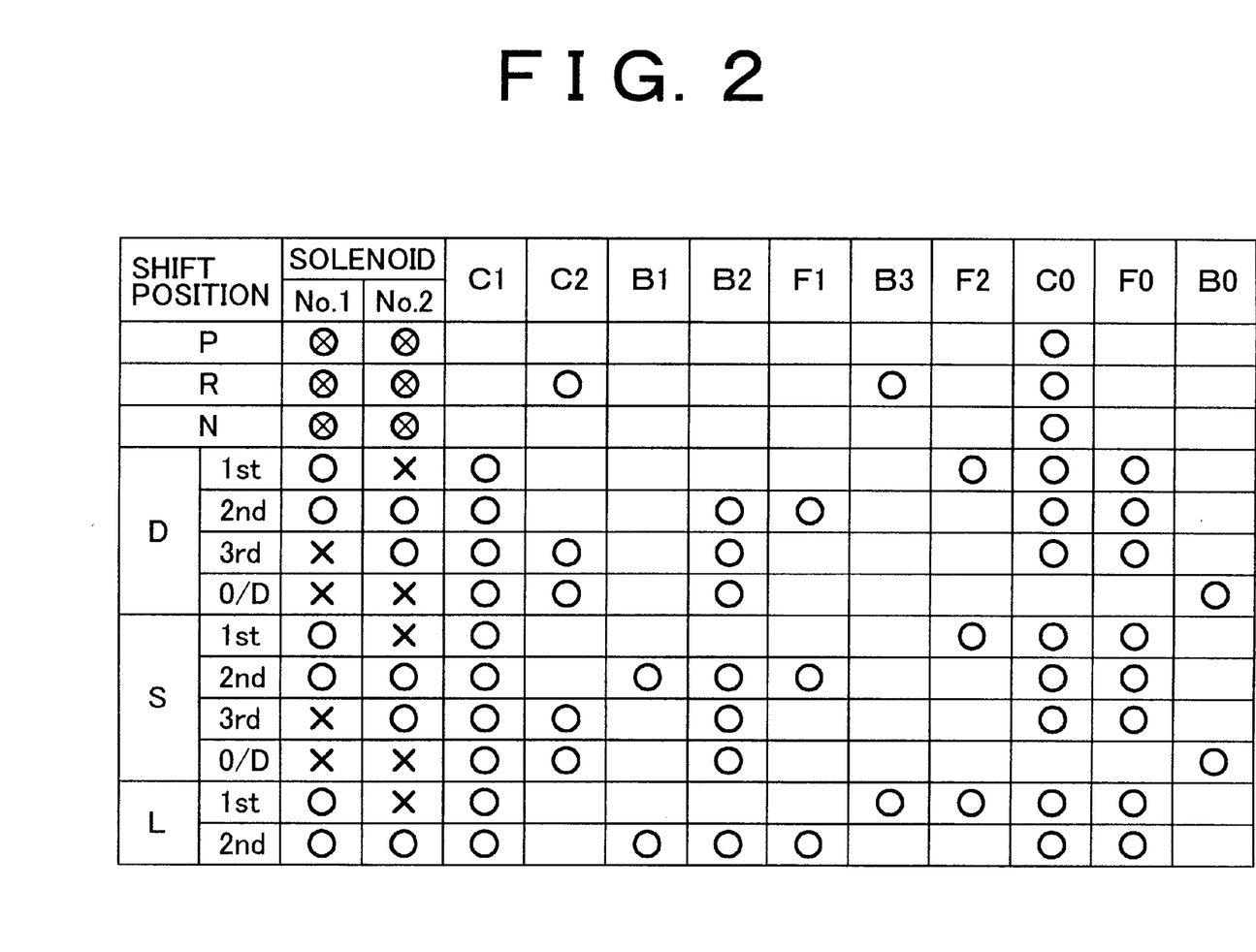
FIG. 2 is a table describing a relation between a combination of operation between a first electromagnetic valve and a second electromagnetic valve, and a shifting speed obtained thereby, in an automatic transmission provided with a torque converter having a lock-up clutch.

The clutches C0, C1 and C2, and the brakes B0, B1, B2 and B3 are constituted, for example, by a multi-disc type clutch, a band brake provided with one band or two bands having opposite winding directions, or the like, and are structured so as to be respectively operated by hydraulic actuators. Then, operations of the hydraulic actuators are respectively controlled by an electronic control apparatus 42 to be mentioned below, whereby a shifting speed with four forward speeds and one backward speed respectively having different change gear ratios I (=rotational speed of input shaft 20/rotational speed of counter shaft 40) can be obtained as shown in FIG. 2. In FIG. 2, "1st", "2nd", "3rd" and "O/D (overdrive)" respectively denote a first speed gear stage, a second speed gear stage, a third speed gear stage and a fourth speed gear stage in the forward movement, and the change gear ratio mentioned above becomes sequentially smaller from the first speed gear stage to the fourth speed gear stage. In this case, since the torque converter 12 and the automatic transmission 14 are symmetrically structured with respect to an axis, FIG. 1 shows them in such a manner as to omit a lower side of a rotational axis of the input shaft 20 and an upper side of a rotational axis of the counter shaft 40.

Further, a hydraulic control circuit 44 is provided with a shift transmission controlling hydraulic control circuit for controlling the gear stages of the automatic transmission 14, and a lock-up clutch controlling hydraulic control circuit for controlling an engagement of the lock-up clutch 32. The shift transmission controlling hydraulic control circuit is provided with a first electromagnetic valve 46 and a second electromagnetic valve 48 which are respectively turned on and off by a solenoid No. 1 and a solenoid No. 2 as is well known. In addition, it is structured such that the clutch and the brake are selectively operated as shown in FIG. 2 on the basis of the combination of operation between the first electromagnetic valve 46 and the second electromagnetic valve 48, whereby any one of the first speed gear stage to the fourth speed gear stage mentioned above is established.

Figure 3:
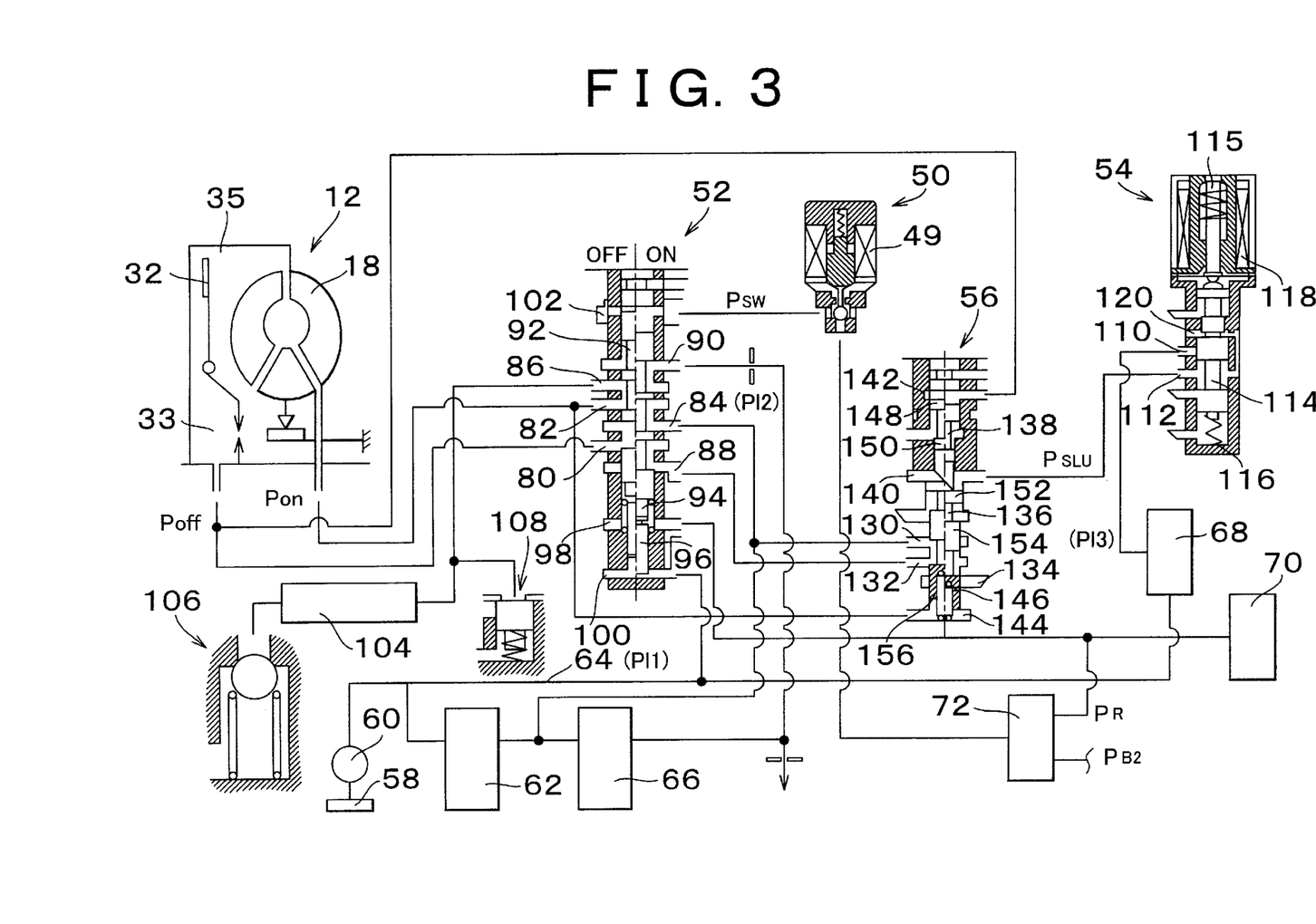
FIG. 3 is a view describing a main structure of a hydraulic control circuit.

Further, the lock-up clutch controlling hydraulic control circuit is provided, for example, as shown in FIG. 3, with a third electromagnetic valve 50 which is turned on and off by a switching electromagnetic solenoid 49 so as to generate a switching signal pressure Psw, a clutch switch valve 52 which is switched to a disengagement-side position for making the lock-up clutch 32 in a disengaged state and an engagement-side position for making the lock-up clutch 32 in an engaged state corresponding to the switching signal pressure Psw, a linear solenoid valve 54 which generates a slip controlling signal pressure PSLU corresponding to a drive electric current ISLU supplied from the electronic control apparatus 42, and a slip control valve 56 which adjusts a pressure difference ΔP between the engagement-side hydraulic chamber 35 and the disengagement-side hydraulic chamber 33 serving as an engagement pressure of the lock-up clutch 32 corresponding to the slip controlling signal pressure PSLU output from the linear solenoid valve 54, and controls a slip amount of the lock-up clutch 32.

In FIG. 3 mentioned above, a pump 60 for sucking and pressure feeding a working fluid flowing back to a tank (not shown) via a strainer 58 is structured so as to be rotated by the engine 10. A pressure of the working fluid pressure fed from the pump 60 is designed so as to be adjusted to a first line pressure Pl1 by an overflow type first pressure adjusting valve 62. This first pressure adjusting valve 62 generates the first line pressure Pl1 which is increased corresponding to a throttle pressure output from a throttle valve opening detecting valve (not shown), and outputs via a first line oil passage 64. A second pressure adjusting valve 66 is an overflow type pressure adjusting valve, and generates a second line pressure Pl2 corresponding to an output torque of the engine 10 by adjusting a pressure of the working fluid flowed out from the first pressure adjusting valve 62 on the basis of the throttle pressure mentioned above. A third pressure adjusting valve 68 is a pressure reducing valve in which the first line pressure Pl1 is an original pressure, and generates a fixed third line pressure Pl3. Further, a manual valve 70 generates an R range pressure PR at a time when a shift operation lever 196 is in an R range. Further, an OR valve 72 selects and outputs a pressure PB2 for operating the brake B2 which is engaged in the second speed gear stage or more, or the R range pressure PR mentioned above, which is higher.

The clutch switch valve 52 mentioned above is provided with a disengagement-side port 80 which is communicated with the disengagement-side hydraulic chamber 33, an engagement-side port 82 which is communicated with the engagement-side hydraulic chamber 35, an input port 84 to which the second line pressure Pl2 is supplied, a first discharge port 86 from which the working fluid within the engagement-side hydraulic chamber 35 is discharged at a time when the lock-up clutch 32 is disengaged, a second discharge port 88 from which the working fluid within the disengagement-side hydraulic chamber 33 is discharged at a time when the lock-up clutch 32 is engaged, a supply port 90 to which a part of the working fluid discharged from the second pressure adjusting valve 66 is supplied for cooling during an engagement period of the lock-up clutch 32, a spool valve element 92 which switches a connection state of the ports, a spring 94 which urges the spool valve element 92 toward an off side position, a plunger 96 which is arranged so as to be capable of abutting against an end portion in a side of the spring 94 of the spool valve element 92, a hydraulic chamber 98 which is provided between end surfaces of the spool valve element 92 and the plunger 96 for applying the R range pressure PR to the end surfaces, a hydraulic chamber 100 which receives the first line pressure Pl1 applied to the end surface of the plunger 96, and a hydraulic chamber 102 which applies a switching signal pressure Psw output from the third electromagnetic valve 50 to the end surface of the spool valve element 92 and receives the switching signal pressure Psw for generating a thrust toward an on side position.

The third electromagnetic valve 50 is structured such that a spherical valve element shuts off a communication between the hydraulic chamber 102 and the OR valve 72 in a non-excited state (off state) and the hydraulic chamber 102 is set in a drain pressure, however, in an excited state (on state) communicates the hydraulic chamber 102 with the OR valve 72 so as to apply the switching signal pressure Psw to the hydraulic chamber 102. Accordingly, when the third electromagnetic valve 50 is in the off state, the switching signal pressure Psw output from the third electromagnetic valve 50 is not applied to the hydraulic chamber 102, and the spool valve element 92 is positioned at the off side position in accordance with an energizing force of the spring 94 and the first line pressure Pl1 applied to the hydraulic chamber 100. Therefore, the input port 84 and the disengagement-side port 80, and the engagement-side port 82 and the first discharge port 86 are respectively communicated with each other. Accordingly, a hydraulic pressure Poff within the disengagement-side hydraulic chamber 33 is made higher than a hydraulic pressure Pon within the engagement-side hydraulic chamber 35, whereby the lock-up clutch 32 is disengaged. Simultaneously, the working oil within the engagement-side hydraulic chamber 35 is discharged to the drain via the first discharge port 86 mentioned above, an oil cooler 104 and a check valve 106.

On the contrary, when the third electromagnetic valve 50 is in the on state, the switching signal pressure Psw output from the third electromagnetic valve 50 is applied to the hydraulic chamber 102 and the spool valve element 92 is positioned at the on side position against the energizing force of the spring 94 and the first line hydraulic pressure P11 applied to the hydraulic chamber 100, so that the input port 84 and the engagement-side port 82, the disengagement-side port 80 and the second discharge port 88, and the supply port 90 and the first discharge port 86 are respectively communicated. Accordingly, the hydraulic pressure Pon within the engagement-side hydraulic chamber 35 is made higher than the hydraulic pressure Poff within the disengagement-side hydraulic chamber 33 and the lock-up clutch 32 is engaged, and simultaneously the working fluid within the disengagement-side hydraulic chamber 33 is discharged to the drain via the second discharge port 88 and the slip control valve 56.

Figure 4:
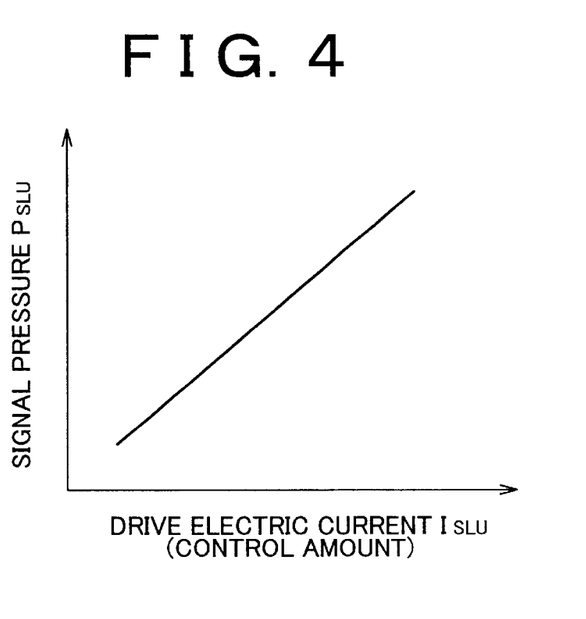
FIG. 4 is a view showing an output characteristic of a linear solenoid valve shown in FIG. 3.

The linear solenoid valve 54 mentioned above is a pressure reducing valve in which the fixed third line pressure Pl3 generated in the third pressure adjusting valve 68 is an original pressure, generates a slip controlling signal pressure PSLU which becomes greater corresponding to a drive electric current ISLU output from the electronic control apparatus 42 as shown in FIG. 4, and applies the slip controlling signal pressure PSLU to the slip control valve 56. The linear solenoid valve 54 is provided with a supply port 110 to which the third line pressure Pl3 is supplied, an output port 112 which outputs the slip controlling signal pressure PSLU, a spool valve element 114 which opens and closed them, a spring 115 which energizes the spool valve element 114 in a valve opening direction, a spring 116 which energizes the spool valve element 114 in a valve opening direction by a smaller thrust than the spring 115, a slip controlling electromagnetic solenoid 118 which energizes the spool valve element 114 in a valve opening direction in accordance with the drive electric current ISLU, and a hydraulic chamber 120 which receives a feedback pressure (the slip controlling signal pressure PSLU) for generating the thrust in the valve opening direction in the spool valve element 114, and the spool valve element 114 is operated such that the energizing force in the valve opening direction obtained by the electromagnetic solenoid 118 and the spring 116 balances with the energizing force in the valve closing direction obtained by the spring 115 and the feedback pressure.

The slip control valve 56 is provided with a line pressure port 130 to which the second line pressure P12 is supplied, a receiving port 132 which receives the working fluid within the disengagement-side hydraulic chamber 33 discharged from the second discharge port 88, a drain port 134 for discharging the working fluid received in the receiving port 132, a spool valve element 136 which is provided so as to be movable in a direction toward a first position (a right position in FIG. 3) increasing a pressure difference $\Delta P$ (=Pon−Poff) between the engagement-side hydraulic chamber 35 and the disengagement-side hydraulic chamber 33) by communicating between the receiving port 132 and the drain port 134 so as to discharge the working fluid within the disengagement-side hydraulic chamber 33 and toward a second position (a left position in FIG. 3) reducing the $\Delta P$ mentioned above by communicating between the receiving port 132 and the line pressure port 130 so as to supply the second line pressure P12 within the disengagement-side hydraulic chamber 33, a plunger 138 which is arranged so as to be capable of abutting against the spool valve element 186 for energizing the spool valve element 136 toward the first position, a signal pressure hydraulic chamber 140 which receives the slip controlling signal pressure PSLU for applying the slip controlling signal pressure PSLU to the plunger 138 and the spool valve element 136 so as to respectively generate the thrusts in directions moving apart from each other in the plunger 138 and the spool valve element 136, a hydraulic chamber 142 which receives the hydraulic pressure Poff for applying the hydraulic pressure Poff within the disengagement-side hydraulic chamber 33 to the plunger 138 so as to generate the thrust in a direction moving the spool valve element 136 toward the first position in the plunger 138, a hydraulic chamber 144 which receives the hydraulic pressure Pon for applying the hydraulic pressure Pon within the engagement-side hydraulic chamber 35 to the spool valve element 136 so as to generate the thrust in a direction toward the second position in the spool valve element 136, and a spring 146 which is received in the signal pressure hydraulic chamber 140 so as to energize the spool valve element 136 in the direction toward the second position.

In this case, a first land 148 and a second land 150 having cross sectional areas A1 and A2 which become sequentially smaller from the hydraulic chamber 142 side are formed in the plunger 138, and a third land 152 having a cross sectional area A3, a fourth land 154 having a cross sectional area A4 of which the cross sectional area is smaller than that of A3 and the same as that of the area A1, and a fifth land 156 having a cross sectional area A5 which is the same as the area A1 are formed in the spool valve element 136, from the signal pressure hydraulic chamber 140 side. The cross sectional areas of the lands have a relation A3>A1 (=A4=A5)>A2. Accordingly, in a state in which the clutch switch valve 52 is in the on state, the slip controlling signal pressure PSLU is comparatively small, and a relation shown in a formula (1) is established, and the plunger 138 abuts against with the spool valve element 136 so as to be integrally applied to each other, whereby a pressure difference $\Delta P$ having a magnitude corresponding to the slip controlling signal pressure PSLU is formed. At this time, the pressure difference $\Delta P$ changes in a comparatively gentle manner in accordance with an incline $[(A3-A2)/A1]$ on the basis of a formula (2) with respect to the slip controlling signal pressure PSLU. In this case, in the formula (2), Fs is an energizing force of the spring 146.

$$A1 \cdot Poff > A2 \cdot PSLU \tag{1}$$

$$\Delta P = Pon - Poff = [(A3-A2)/A1]PSLU - Fs/A1 \tag{2}$$

However, when the slip controlling signal pressure PSLU becomes larger than a predetermined value PA, a relation shown in a formula (3) is established. The predetermined value PA is a value which is previously determined such that a change range ΔPslip of the pressure difference ΔP having a sufficient magnitude required for the slip control of the lock-up clutch 32 can be obtained, and the respective cross sectional areas and the like are set such that the relation shown in the formula (3) is established at a time when the slip controlling signal pressure PSLU becomes the value PA. Accordingly, the plunger 138 and the spool valve element 136 move apart from each other, and the spool valve element 136 is operated such that a formula (4) is established. However, since the slip control valve 56 is structured such that the receiving port 132 thereof and the drain port 134 are communicated with each other, in a state in which the spool valve element 136 is operated such that the formula (4) is established, the hydraulic pressure Poff within the disengagement-side hydraulic chamber 33 is further reduced so as to become the atmospheric pressure, a relation ΔP=Pon is established and a complete engagement is established. A solid line in FIG. 5 shows a change property of the pressure difference ΔP obtained by the operation of the slip control valve 56 structured in the manner mentioned above with respect to the slip controlling signal pressure PSLU.

$$A1 \cdot Poff < A2 \cdot PSLU \quad (3)$$

$$A3 \cdot PSLU = A4 \cdot Pon + Fs \quad (4)$$

Figure 5:
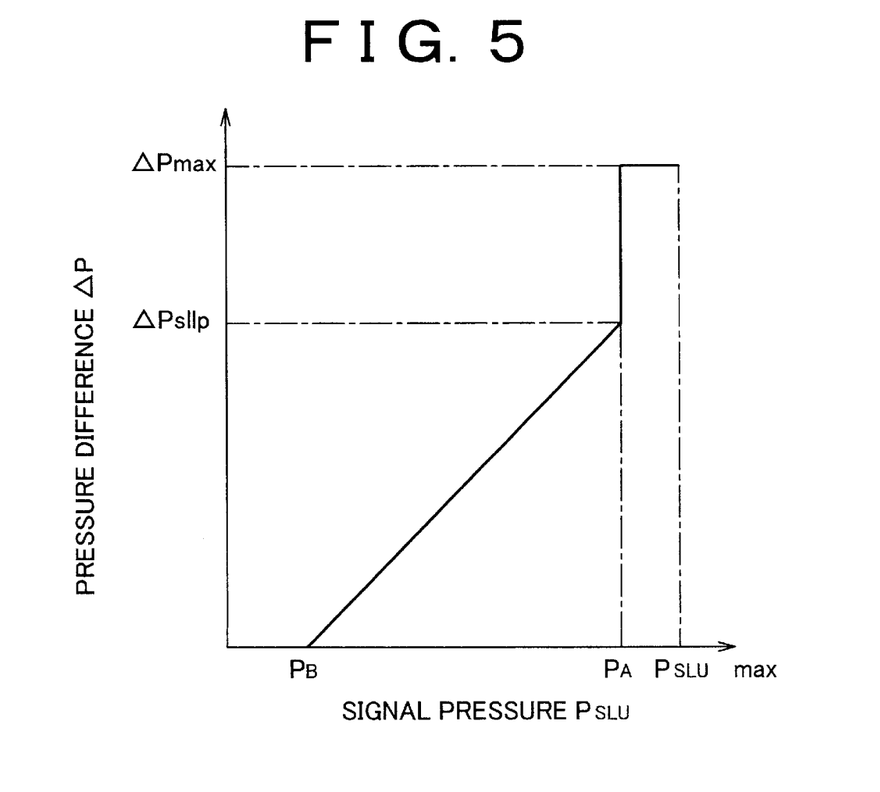
FIG. 5 is a view showing a property of a slip control valve provided in the hydraulic control circuit in FIG. 3.

Further, as shown in FIG. 5, when the slip controlling signal pressure PSLU becomes small so as to become a value PB in which a formula (5) is established, the relation that the pressure difference ΔP=0 is established, so that the lock-up clutch 32 is made in the disengaged state in spite that the switch valve 52 is in the on state.

$$A3 \cdot Pon > A \cdot PSLU \quad (5)$$

Referring back to FIG. 1, an electronic control apparatus 178 for an engine executing a fuel injection control, a fuel-cut control, an ignition timing control and the like in which a fuel injection amount is controlled by a fuel injection valve (not shown) corresponding to an intake air amount, is provided in a vehicle. In this fuel-cut control, when an engine rotational speed NE becomes equal to or more than a preset fuel-cut rotational speed Ncut at a time of a deceleration coasting travel in which a throttle valve opening TA is equal to or less than a predetermined value close to 0, a fuel supply to the engine 10 is stopped, for example, by closing the fuel injection valve. This fuel supply stop aims to improve a fuel consumption.

The electronic control apparatus 42 is a so-called micro computer constituted by a CPU 182, a ROM 184, a RAM 186, an interface (not shown) and the like. It is designed such that a signal expressing a throttle valve opening TA, a signal expressing the engine rotational speed NE (that is, an input side rotational speed of the lock-up clutch 32), a signal expressing an input shaft rotational speed Nin (a turbine rotational speed NT, that is, an output side rotational speed of the lock-up clutch 32), a signal expressing an output shaft rotational speed Nout corresponding to a vehicle speed V, and a signal expressing an operation position Ps of the shift operation lever 196 are respectively supplied to the electronic control apparatus 42 from a throttle sensor 188 which is provided in an intake pipe of the engine 10 so as to detect an opening of a throttle valve 187 opened and closed by an operation of an acceleration pedal (not shown), an engine rotational speed sensor 190 which detects a rotational speed of the engine 10, an input shaft rotational sensor 192 which detects a rotational speed of the input shaft 20 in the automatic transmission 14, a counter shaft rotational sensor 194 which detects a rotational speed of the counter shaft 40 in the automatic transmission 14, and an operating position sensor 198 for detecting an operating position of the shift operation lever 196, that is, any one of ranges L, S, D, N, R and P. The CPU 182 of the electronic control apparatus 42 mentioned above processes the input signals in accordance with a program previously stored in the ROM 184 while utilizing a temporary storing function of the RAM 186, executes a shift transmission control of the automatic transmission 14 and an engagement control of the lock-up clutch 32 in accordance with a main routine (not shown), and controls the first electromagnetic valve 46, the second electromagnetic valve 48, the third electromagnetic valve 50 and the linear solenoid valve 54, respectively.

In the shift transmission control mentioned above, a shift transmission graph corresponding to an actual shift transmission gear stage is selected on the basis of a plurality of kinds of shift transmission graphs previously stored in the ROM 184, and the shift transmission gear stage is determined on the basis of the vehicle traveling state, for example, the throttle valve opening TA and the vehicle speed computed from the output shaft rotational speed Nout, in accordance with the shift transmission graph, and the first electromagnetic valve 46 and the second electromagnetic valve 48 are driven such that the shift transmission gear stage is obtained, whereby the operations of the clutches C0, C1 and C2 and the brakes B0, B1, B2 and B3 in the automatic transmission 14 are controlled, and any one gear state of four forward speeds is established.

The engagement control of the lock-up clutch 32 mentioned above is structured so as to be executed, for example, during the traveling in the second speed gear stage, the third speed gear stage and the fourth speed gear stage. In the engagement control, according to the relation previously stored in the ROM 184 as required by an engagement control routine (not shown), it is determined whether the lock-up clutch 32 is in the disengagement area, the slip control area, or engagement area, based on the vehicle's running state such as the output shaft rotational speed (vehicle speed) Nout and the throttle valve opening TA. The third electromagnetic valve 50 and the linear solenoid valve 54 are driven on the basis of the result of judgement, whereby the operation of the lock-up clutch 32 is controlled.

Figure 6:
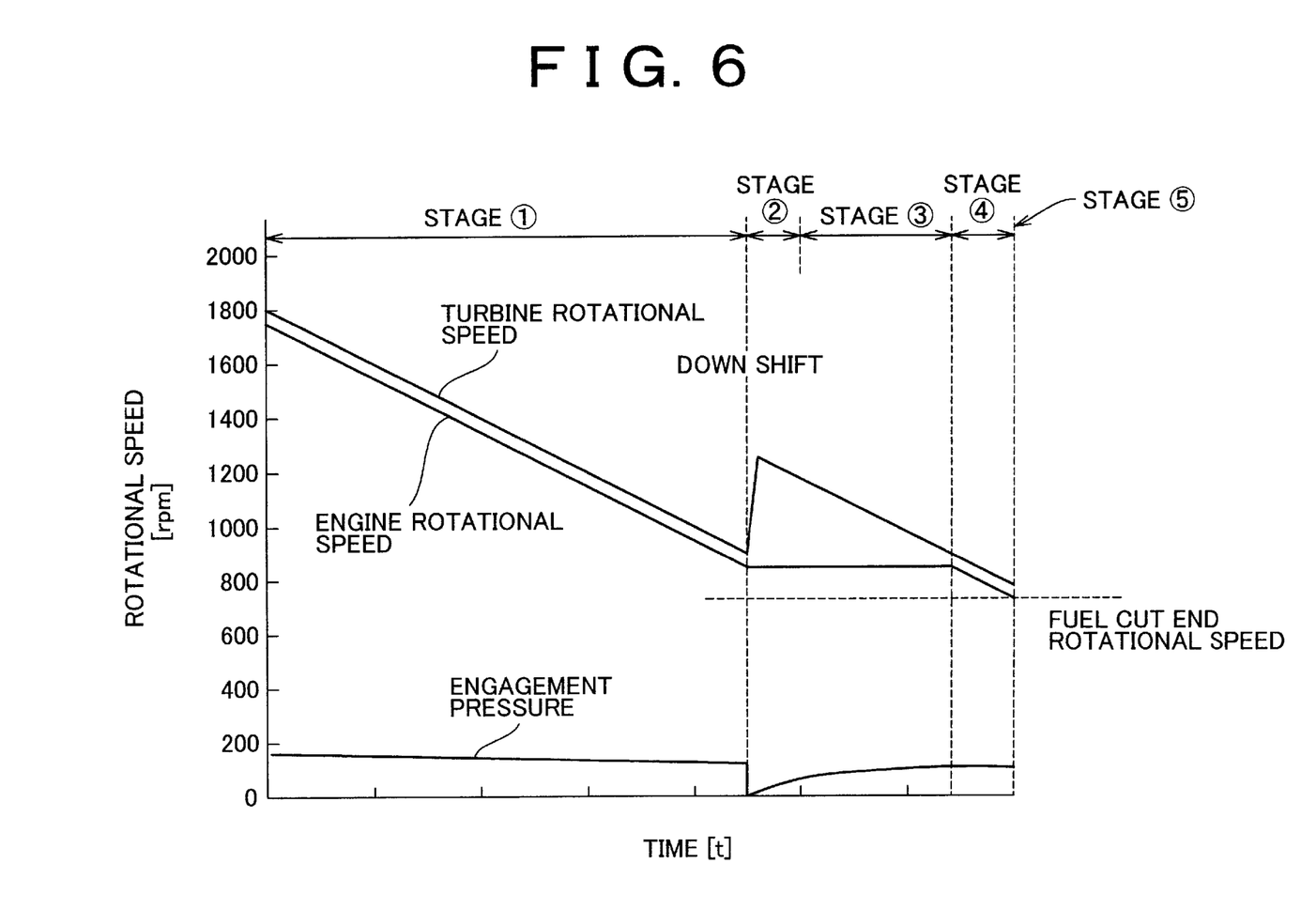
FIG. 6 is a view showing a change with time between an engine rotational speed and a turbine rotational speed which are obtained by a control operation of an electronic control apparatus, and an engagement pressure of the lock-up clutch.

Further, the electronic control apparatus 42 executes a so-called deceleration slip control which slip controls the lock-up clutch 32 during the execution of the fuel-cut control at a time of the deceleration coasting travel mentioned above, and executes a shift transmission control of down shifting the automatic transmission 14 during the deceleration slip, thereby making the fuel cut time long. FIG. 6 is a view for explaining the control operation in accordance with the control mentioned above, and shows a change with time of the engine rotational speed NE and the turbine rotational speed NT at a time when the electronic control apparatus 42 executes the control mentioned above, and the engagement pressure of the lock-up clutch 32.

With reference to FIG. 6, the electronic control apparatus 42 controls the slip amount of the lock-up clutch 32 by adjusting the engagement pressure of the lock-up clutch 32 to a predetermined pressure. Since a phase of the deceleration slip control is separated into five stages, they are respectively called as stages, and the respective stages are shown in an upper step in FIG. 6.

A stage 1 corresponds to a state of adjusting the engagement pressure of the lock-up clutch 32 such that the slip amount of the lock-up clutch 32 becomes a predetermined target slip amount within a deceleration slip control executing condition. Corresponding to the deceleration, the turbine rotational speed NT and the engine rotational speed NE move downward to a level, for example, from 1800 rpm to 900 rpm, as shown in FIG. 6. In the fuel-cut control, a fuel-cut end rotational speed Nret is previously determined, and when the rotational speed NE of the engine becomes equal to or less than the fuel-cut end rotational speed Nret (about 700 rpm in FIG. 6), the fuel-cut control is finished, and the fuel supply to the engine 10 is restarted.

Accordingly, the down shift of the automatic transmission 14 is executed in a stage that the turbine rotational speed NT becomes a predetermined down shift judging rotational speed NT1 which is higher than the fuel-cut end rotational speed Nret, that is, in a stage that the engine rotational speed NE becomes higher than the fuel-cut end rotational speed Nret (a stage 2) by a predetermined amount. Then, the turbine rotational speed NT is increased, a reduction of the engine rotational speed NE is restricted, and a fuel-cut time is made long. That is, a reduction of the engine rotational speed NE is restricted, whereby it is possible to increase a time required until the engine rotational speed NE reaches the fuel-cut end rotational speed Nret.

In this case, the down shift judging rotational speed NT1 is generally set to a value in which the predetermined amount becomes between some tens rpm and a hundred and some tens rpm, although the speed NT1 is different in the respective gear stages. This value is previously set at every gear stages, and is stored in the ROM 184 of the electronic control apparatus 42.

In this case, the judgement of executing the down shift may employ the engine rotational speed NE in place of the turbine rotational speed NT, or the down shift may be executed at a time when any one of the turbine rotational speed NT or the engine rotational speed NE reaches the down shift judging rotational speed.

Further, at this time, the engine rotational speed NE is going to be increased corresponding to the increase of the turbine rotational speed NT. The increase of the engine rotational speed NE mentioned above causes an increase of an engine friction torque and an inertia torque, and an increase of the vehicle reducing speed. In the stage 2 and a stage 3, in order to restrict the increase of the vehicle reducing speed mentioned above, the lock-up clutch 32 is slip controlled so as to restrict the increase of the engine rotational speed NE corresponding to the shift down of the automatic transmission 14. In particular, an engagement pressure of the lock-up clutch 32 is adjusted as shown in a lower step in FIG. 6 such that the lock-up clutch 32 is slipped so as to keep the engine rotational speed NE in the engine rotational speed immediately before the down shift.

The turbine rotational speed NT is reduced in this state, and when a difference between the turbine rotational speed NT and the engine rotational speed NE, that is, a slip amount of the lock-up clutch 32 becomes small to a target slip amount, the engagement pressure of the lock-up clutch 32 is adjusted such that the slip amount of the lock-up clutch 32 becomes a predetermined target slip amount in the same manner as that in the stage 1 (a stage 4).

Further, when the engine rotational speed NE or the turbine rotational speed NT becomes equal to or less than a deceleration slip end rotational speed, the slip control of the lock-up clutch 32 is finished, and the lock-up clutch 32 is disengaged (a stage 5).

Figure 7:
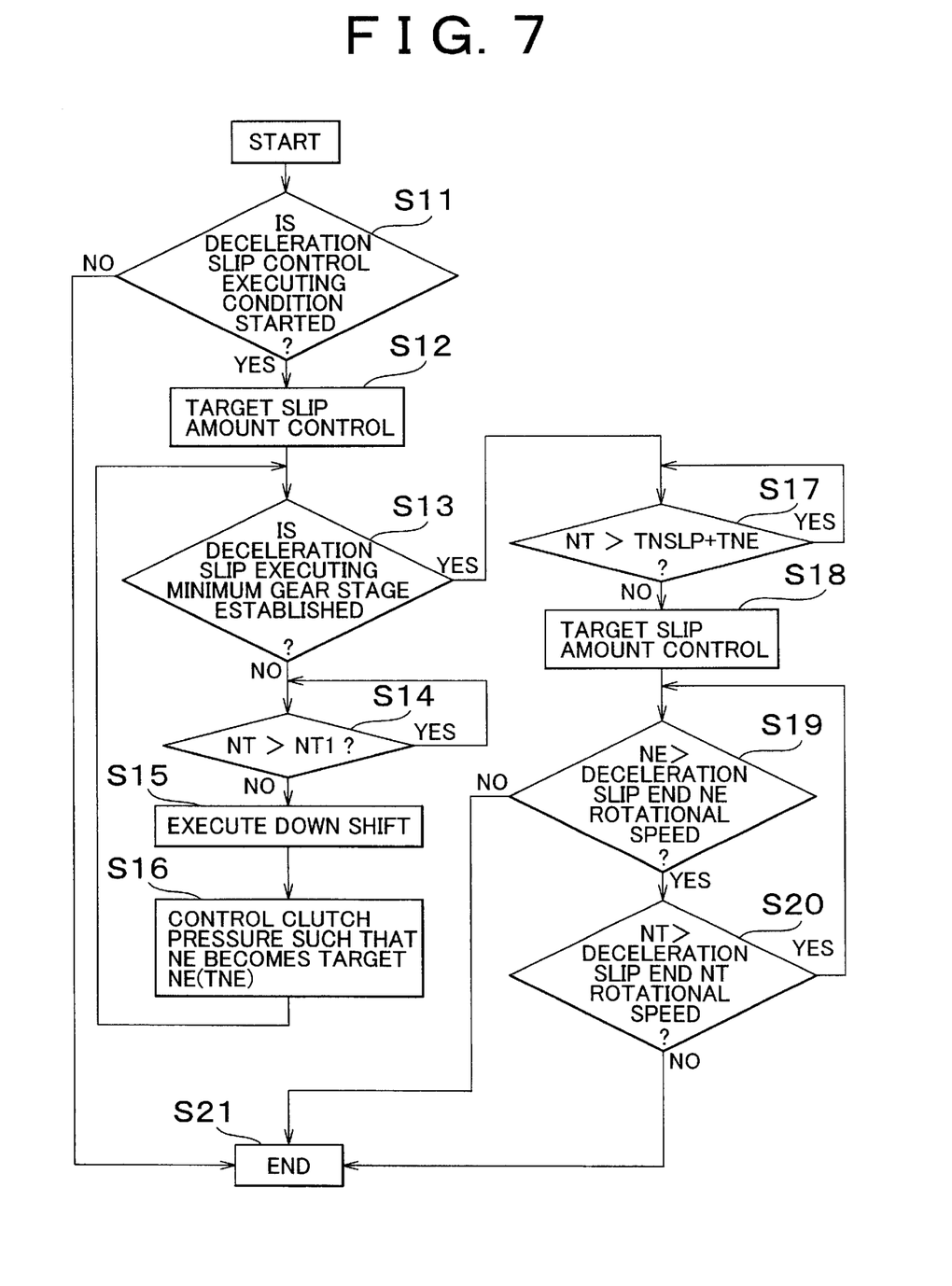
FIG. 7 is a flow chart showing a content of the control of the lock-up clutch.

FIG. 7 is a view showing an example of a particular processing flow of executing the control operation shown in FIG. 6. With reference to FIG. 7, at first, in a step S11, it is judged whether or not the deceleration slip control executing condition is established. If the deceleration slip control executing condition is established (YES in S11), that is, the stage 1 mentioned above is established, a target slip amount control of controlling the engagement pressure (the clutch pressure) of the lock-up clutch 32 is next executed in a step S12 such that the slip amount of the lock-up clutch 32 becomes a predetermined target slip amount TNSLP.

Next, in a step S13, it is judged whether or not the gear stage is a deceleration slip executing minimum gear stage. For the deceleration slip executing minimum gear stage, for example, a lowest gear stage capable of making the engine 10 in a driven state at a time of the deceleration coasting travel is set. When it is judged that the gear stage is not the deceleration slip executing minimum gear stage (NO in S13), that is, it is judged that the deceleration slip control can be executed even when down shifting the automatic transmission 14, it is next judged in a step S14 whether or not the turbine rotational speed NT is larger than the down shift judging rotational speed NT1.

When the turbine rotational speed NT becomes equal to or less than the down shift judging rotational speed NT1 (NO in S14), the stage moves to the stage 2 and the stage 3 mentioned above, and next, the down shift of the automatic transmission 14 is executed in a step S15. Further, in a step S16, a target engine rotational speed TNE is set so as to restrict an increase of the engine rotational speed NE corresponding to the down shift, and the clutch pressure is controlled such that the engine rotational speed NE becomes the target rotational speed TNE. The target engine rotational speed TNE is set to the engine rotational speed immediately before the down shift is executed, however, it may be set to the down shift judging rotational speed NT1 in place thereto, or may be set to a predetermined value which is slightly higher than the fuel-cut end rotational speed Nret.

Next, the processing goes back to the step S13, and it is judged whether or not the gear stage after the down shift is the deceleration slip executing minimum gear stage. The processing is turned back to the step S13 because of restricting the reduction of the engine rotational speed NE as much as possible, by repeating the down shift until the gear stage becomes the minimum gear stage capable of executing the deceleration slip control. As a result, the down shift of the automatic transmission can delay reach of the engine rotational speed NE to the fuel-cut end rotational speed Nret, and make the fuel-cut time longer. In place of process of turning back to the step S13, it may proceed to a step S17 from step S16 without repeating the down shift.

Further, when it is judged that the gear stage after the down shift is not the deceleration slip executing minimum gear stage (NO in S13), the down shift is again executed in the step S15 after the turbine rotational sped NT becomes equal to or less than the down shift judging rotational speed NT1 (NO in S14), and in a step S16, the clutch pressure is controlled such that the engine rotational speed NE becomes the target engine rotational speed TNE.

In this case, by employing the turbine rotational speed NT for judging the execution of the down shift in the step S14, the down shift of the automatic transmission 14 in step S15 can be executed even when the engine rotational speed NE is kept after the engine rotational speed NE becomes the rotational speed higher than the fuel-cut end rotational speed Nret by a predetermined amount.

Further, if it is judged that the gear stage after the down shift is the deceleration slip executing minimum gear stage (YES in S13), it is judged in a step S17 whether or not the turbine rotational speed NT is larger than a value obtained by adding the target engine rotational speed TNE to the target slip amount TNSLP. In this case, the engine rotational speed NE may be employed in place of the target engine rotational speed TNE. Further, if the turbine rotational speed NT becomes equal to or less than an amount obtained by adding the target engine rotational speed TNE to the target slip amount TNSLP (NO in S17), the stage moves to the stage 4 mentioned above, and the target slip amount control is executed in a step S18.

Next, it is judged in a step S19 whether or not the engine rotational speed NE is larger than the deceleration slip end NE rotational speed. In the case where the engine rotational speed NE is larger than the deceleration slip end NE rotational speed, it is judged in a step S20 whether or not the turbine rotational speed NT is larger than the deceleration slip end NT rotational speed. Further, when either of the engine rotational speed NE or the turbine rotational speed NT becomes equal to or more than the deceleration slip end rotational speed, the stage goes to the stage 5 mentioned above, and the slip control of the lock-up clutch 32 is finished in a step S21.

The embodiment disclosed this time should be considered to only exemplify the invention in every aspect and not to limit the invention. The scope of the invention is described not by the description mentioned above but by the scope of claims for a patent. Further, it is intended that the invention includes all the modifications within meanings and scopes equivalent to the scope of claims for a patent.

What is claimed is:

1. A control apparatus of a lock-up clutch for a vehicle having a hydraulic power transmission with a lock-up clutch which directly connects between an engine and an automatic transmission, the control apparatus comprising:
    a fuel-cut control portion stopping supplying a fuel to the engine at a time when the vehicle is decelerated, and restarting supplying the fuel to the engine at a time of judging that a rotational speed of the engine becomes a predetermined fuel-cut end rotational speed;
    a slip control portion which executes a slip control of the lock-up clutch at the time when the vehicle is decelerated; and
    a shift transmission control portion which performs a down shift of the automatic transmission at a time of judging that at least any one of the rotational speed of the engine and an input shaft rotational speed of the automatic transmission becomes a down shift rotational speed which is higher than the fuel-cut end rotational speed by a predetermined amount, during an execution of the slip control by the slip control portion.

2. A control apparatus according to claim 1, wherein the slip control portion changes a slip amount of the lock-up clutch so as to restrict the increase of the rotational speed of the engine in accordance with the down shift of the automatic transmission.

3. A control apparatus according to claim 2, wherein the slip control portion slips the lock-up clutch so as to prevent the rotational speed of the engine from being increased in accordance with the down shift of the automatic transmission.

4. A control apparatus according to claim 3, wherein the slip control portion slips the lock-up clutch so as to keep the rotational speed of the engine during a period after the automatic transmission has performed the down shift and until an input shaft rotational speed of the automatic transmission reaches a predetermined rotational speed relative to an engine rotational speed immediately before the automatic transmission performs the down shift.

5. A control apparatus according to claim 2, wherein the slip control portion adjusts an engagement pressure of the lock-up clutch such that the rotational speed of the engine becomes an target engine rotational speed, thereby changing the slip amount.

6. A control apparatus according to claim 5, wherein the target engine rotational speed is set to the engine rotational speed immediately before the down shift of the automatic transmission.

7. A control apparatus according to claim 1, wherein, the shift transmission control portion repeats the down shift of the automatic transmission from a gear stage of the automatic transmission being capable of executing the slip control until a gear stage being uncapable of executing the slip control, thereby increasing a time required until the rotational speed of the engine becomes the fuel-cut end rotational speed.

8. A control apparatus according to claim 7, wherein, the shift transmission control portion shifts down the automatic transmission at a time of judging that at least any one of the rotational speed of the engine and the input shaft rotational speed of the automatic transmission becomes the down shift rotational speed, during a deceleration of the rotational speed of the engine and the execution of the slip control by the slip control portion, and
    after the down shift, the slip control portion adjusts a slip amount of the lock-up clutch so as to restrict the increase of the rotational speed of the engine, and the shift transmission control portion judges whether the input shaft rotational speed of the automatic transmission becomes the down shift rotational speed, at a time of judging that the input shaft rotational speed of the automatic transmission becomes the down shift rotational speed, the shift transmission control portion performs next down shift.

9. A control apparatus of a lock-up clutch for a vehicle having a lock-up clutch which directly connects between an engine and an automatic transmission, the control apparatus comprising:
    a slip control portion increasing a fuel-cut time required from a start of a fuel-cut at which a fuel supply to the engine is stopped and until an engine rotational speed reaches a fuel-cut end rotational speed, by slip controlling the lock-up clutch at a deceleration of the vehicle; and
    a shift transmission control portion which increases the fuel-cut time by shifting down the automatic transmission immediately before the engine rotational speed reaches the fuel-cut end rotational speed.

10. A control method of a lock-up clutch for a vehicle having a hydraulic power transmission with a lock-up clutch which directly connects between an engine and an automatic transmission, comprising:
    a step of stopping supplying a fuel to the engine at a deceleration of the vehicle, and restarting supplying the fuel to the engine at a time of judging that a rotational speed of the engine becomes a predetermined fuel-cut end rotational speed;
    a step of executing a slip control of the lock-up clutch at the deceleration of the vehicle; and
    a step of shifting down the automatic transmission at a time of judging that at least any one of the rotational speed of the engine and an input shaft rotational speed of the automatic transmission becomes a down shift rotational speed which is higher than the fuel-cut end rotational speed by a predetermined amount, during an execution of the slip control.

11. A control method according to claim 10, wherein a slip amount of the lock-up clutch is adjusted so as to restrict the increase of the rotational speed of the engine in accordance with the down shift of the automatic transmission, in the slip control.

12. A control method according to claim 11, wherein the lock-up clutch is slipped such that the rotational speed of the engine is not increased in accordance with the down shift of the automatic transmission, in the slip control.

13. A control method according to claim 12, wherein the lock-up clutch is slipped so as to keep the rotational speed of the engine during a period after the automatic transmission has performed the down shift and until the input shaft rotational speed of the automatic transmission reaches a predetermined rotational speed relative to an engine rotational speed immediately before the automatic transmission performs the down shift, in the slip control.

14. A control method of a lock-up clutch for a vehicle having a lock-up clutch which directly connects between an engine and an automatic transmission, comprising:

a step of increasing a fuel-cut time required from a start of a fuel-cut at which a fuel supply to the engine is stopped and until an engine rotational speed reaches a fuel-cut end rotational speed, by slip controlling the lock-up clutch at a deceleration of the vehicle; and a step of increasing the fuel-cut time by shifting down the automatic transmission immediately before the engine rotational speed reaches the fuel-cut end rotational speed.

* * * * *